US007386834B2

United States Patent
Van De Vanter et al.

(10) Patent No.: US 7,386,834 B2
(45) Date of Patent: *Jun. 10, 2008

(54) UNDO/REDO TECHNIQUE FOR TOKEN-ORIENTED REPRESENTATION OF PROGRAM CODE

(75) Inventors: Michael L. Van De Vanter, Mountain View, CA (US); Kenneth B. Urquhart, Holly Springs, NC (US)

(73) Assignee: Sun Microsystems, Inc., Santa Clara, CA (US)

( * ) Notice: Subject to any disclaimer, the term of this patent is extended or adjusted under 35 U.S.C. 154(b) by 781 days.

This patent is subject to a terminal disclaimer.

(21) Appl. No.: 10/185,761

(22) Filed: Jun. 28, 2002

(65) Prior Publication Data

US 2004/0006764 A1    Jan. 8, 2004

(51) Int. Cl.
*G06F 9/44* (2006.01)
*G06F 17/00* (2006.01)

(52) U.S. Cl. .................................. 717/110; 715/530
(58) Field of Classification Search ........ 717/110–113, 717/530

See application file for complete search history.

(56) References Cited

U.S. PATENT DOCUMENTS

| 3,893,084 A | 7/1975 | Kotok et al. |
| 4,558,413 A | 12/1985 | Schmidt et al. |
| 4,809,170 A | 2/1989 | Leblang et al. |
| 4,809,710 A | 3/1989 | Williamson |
| 4,931,928 A | 6/1990 | Greenfeld |
| 4,989,145 A | 1/1991 | Kyushima |
| 5,006,992 A | 4/1991 | Skeirik |
| 5,070,478 A | 12/1991 | Abbott |
| 5,079,700 A | 1/1992 | Kozoll et al. |

(Continued)

OTHER PUBLICATIONS

Charles Crowley, "Data Structues for Text Sequences", 1998, CiteSeer, Accessed on Sep. 22, 2005 at <http://citeseer.ist.psu.edu/crowley98data.html>.*

(Continued)

*Primary Examiner*—Tuan Dam
*Assistant Examiner*—J. Derek Rutten
(74) *Attorney, Agent, or Firm*—Darby & Darby PC; M. David Ream

(57) ABSTRACT

An editor or software engineering tool may be configured to represent program code as a doubly-linked list of lexical tokens and to maintain, coincident with an operation that modifies contents of the list, an undo object that identifies opposing end nodes of a sublist of one or more lexical tokens corresponding to a substring that is either inserted into or removed from the list by the operation. In this way, lexical tokens corresponding to an inserted substring can be readily and efficiently excised to restore a pre-insertion tokenized list state. Similarly, lexical tokens corresponding to a removed substring can be readily and efficiently reinstated to restore a pre-deletion tokenized list state. Advantageously, undo support once employed to restore a prior tokenized list state is symmetrically available to support redo operations. In some embodiments in accordance with the present invention, undo-redo entries are maintained in an operation ordered set that is traversed to support one or more operations in either the undo or redo directions. In some realizations, such an ordered set of undo-redo entries is maintained by, or in conjunction with, an undo-redo manager.

27 Claims, 9 Drawing Sheets

U.S. PATENT DOCUMENTS

| | | |
|---|---|---|
| 5,140,521 A | 8/1992 | Kozol et al. |
| 5,155,847 A | 10/1992 | Kirouac et al. |
| 5,224,038 A * | 6/1993 | Bespalko .................... 715/531 |
| 5,239,298 A * | 8/1993 | Wei .............................. 341/51 |
| 5,263,174 A | 11/1993 | Layman |
| 5,287,501 A * | 2/1994 | Lomet ........................ 707/202 |
| 5,293,629 A | 3/1994 | Conley et al. |
| 5,311,422 A | 5/1994 | Loftin et al. |
| 5,313,387 A | 5/1994 | McKeeman et al. |
| 5,377,318 A | 12/1994 | Wolber |
| 5,386,559 A | 1/1995 | Eisenberg et al. |
| 5,386,570 A | 1/1995 | Lindhorst |
| 5,410,701 A | 4/1995 | Gopalraman |
| 5,430,836 A | 7/1995 | Wolf et al. |
| 5,446,895 A | 8/1995 | White et al. |
| 5,481,711 A | 1/1996 | Sotani |
| 5,481,712 A | 1/1996 | Silver et al. |
| 5,485,618 A | 1/1996 | Smith |
| 5,487,000 A | 1/1996 | Takahashi et al. |
| 5,487,147 A | 1/1996 | Brisson |
| 5,490,097 A | 2/1996 | Swenson et al. |
| 5,493,678 A | 2/1996 | Arcuri et al. |
| 5,502,805 A | 3/1996 | Anderson et al. |
| 5,504,902 A | 4/1996 | McGrath et al. |
| 5,513,305 A | 4/1996 | Maghbouleh |
| 5,537,630 A | 7/1996 | Berry et al. |
| 5,557,730 A | 9/1996 | Frid-Nielsen |
| 5,574,898 A | 11/1996 | Leblang et al. |
| 5,577,241 A | 11/1996 | Spencer |
| 5,579,469 A | 11/1996 | Pike |
| 5,583,762 A | 12/1996 | Shafer |
| 5,604,853 A * | 2/1997 | Nagashima .................. 715/540 |
| 5,625,773 A | 4/1997 | Bespalko et al. |
| 5,627,958 A | 5/1997 | Potts et al. |
| 5,628,016 A | 5/1997 | Kukol |
| 5,644,737 A | 7/1997 | Tuniman et al. |
| 5,649,192 A | 7/1997 | Stucky |
| 5,649,200 A | 7/1997 | Leblang et al. |
| 5,649,222 A | 7/1997 | Mogilevsky |
| 5,652,899 A * | 7/1997 | Mays et al. .................. 715/512 |
| 5,671,403 A | 9/1997 | Shekita et al. |
| 5,673,390 A | 9/1997 | Mueller |
| 5,680,619 A * | 10/1997 | Gudmundson et al. ..... 717/108 |
| 5,680,630 A | 10/1997 | Saint-Laurent |
| 5,694,559 A | 12/1997 | Hobson et al. |
| 5,724,593 A | 3/1998 | Hargrave, III et al. |
| 5,734,749 A | 3/1998 | Yamada et al. |
| 5,737,608 A | 4/1998 | Van De Vanter |
| 5,740,444 A | 4/1998 | Frid-Nielsen |
| 5,748,975 A | 5/1998 | Van De Vanter |
| 5,752,058 A | 5/1998 | Van De Vanter |
| 5,754,737 A | 5/1998 | Gipson |
| 5,778,402 A * | 7/1998 | Gipson ........................ 715/530 |
| 5,781,720 A | 7/1998 | Parker et al. |
| 5,781,732 A | 7/1998 | Adams |
| 5,790,778 A | 8/1998 | Bush et al. |
| 5,798,757 A | 8/1998 | Smith |
| 5,802,262 A | 9/1998 | Van De Vanter |
| 5,805,889 A | 9/1998 | Van De Vanter |
| 5,813,019 A | 9/1998 | Van De Vanter |
| 5,825,355 A | 10/1998 | Palmer et al. |
| 5,832,494 A | 11/1998 | Egger et al. |
| 5,844,554 A | 12/1998 | Geller et al. |
| 5,845,120 A | 12/1998 | Reddy et al. |
| 5,845,300 A | 12/1998 | Comer et al. |
| 5,848,394 A | 12/1998 | D'Arrigo et al. |
| 5,850,561 A | 12/1998 | Church et al. |
| 5,857,212 A | 1/1999 | Van De Vanter |
| 5,859,638 A | 1/1999 | Coleman et al. |
| 5,870,608 A | 2/1999 | Gregory |
| 5,872,974 A | 2/1999 | Mezick |
| 5,877,758 A | 3/1999 | Seybold |
| 5,890,103 A | 3/1999 | Carus |
| 5,905,892 A | 5/1999 | Nielsen et al. |
| 5,911,059 A | 6/1999 | Profit, Jr. |
| 5,911,075 A | 6/1999 | Glaser et al. |
| 5,924,089 A | 7/1999 | Mocek et al. |
| 5,959,629 A | 9/1999 | Masui |
| 5,960,196 A | 9/1999 | Carrier, III et al. |
| 5,990,906 A * | 11/1999 | Hudson et al. ............. 345/666 |
| 5,991,799 A | 11/1999 | Yen et al. |
| 6,002,874 A * | 12/1999 | Bahrs et al. ................. 717/157 |
| 6,012,075 A | 1/2000 | Fein et al. |
| 6,014,135 A | 1/2000 | Fernandes |
| 6,016,467 A | 1/2000 | Newsted et al. |
| 6,018,524 A | 1/2000 | Turner et al. |
| 6,023,715 A | 2/2000 | Burkes et al. |
| 6,026,233 A | 2/2000 | Shulman et al. |
| 6,053,951 A | 4/2000 | McDonald et al. |
| 6,061,513 A | 5/2000 | Scandura |
| 6,071,317 A | 6/2000 | Nagel |
| 6,115,544 A | 9/2000 | Mueller |
| 6,119,120 A | 9/2000 | Miller |
| 6,154,847 A * | 11/2000 | Schofield et al. ............... 714/4 |
| 6,163,879 A | 12/2000 | Mackey |
| 6,185,591 B1 * | 2/2001 | Baker et al. ................. 715/531 |
| 6,205,579 B1 | 3/2001 | Southgate |
| 6,212,534 B1 | 4/2001 | Lo et al. |
| 6,226,785 B1 | 5/2001 | Peterson et al. |
| 6,247,020 B1 | 6/2001 | Minard |
| 6,266,665 B1 | 7/2001 | Vaidyanathan et al. |
| 6,275,976 B1 | 8/2001 | Scandura |
| 6,282,551 B1 | 8/2001 | Anderson et al. |
| 6,286,138 B1 | 9/2001 | Purcell |
| 6,305,008 B1 | 10/2001 | Vaidyanathan et al. |
| 6,311,323 B1 | 10/2001 | Shulman et al. |
| 6,349,327 B1 | 2/2002 | Tang et al. |
| 6,425,016 B1 | 7/2002 | Banavar et al. |
| 6,426,761 B1 | 7/2002 | Kanevsky et al. |
| 6,470,306 B1 | 10/2002 | Pringle et al. |
| 6,470,349 B1 | 10/2002 | Heninger et al. |
| 6,507,845 B1 | 1/2003 | Cohen et al. |
| 6,519,763 B1 | 2/2003 | Kaufer et al. |
| 6,604,109 B1 * | 8/2003 | Federighi et al. ........... 707/102 |
| 6,643,661 B2 | 11/2003 | Polizzi et al. |
| 6,658,624 B1 | 12/2003 | Savitzky et al. |
| 6,658,643 B1 | 12/2003 | Bera |
| 6,678,882 B1 | 1/2004 | Hurley et al. |
| 6,760,695 B1 | 7/2004 | Kuno et al. |
| 6,792,595 B1 | 9/2004 | Storistenau et al. |
| 6,795,826 B2 | 9/2004 | Flinn et al. |
| 6,801,026 B2 | 10/2004 | Schrom et al. |
| 6,901,448 B2 | 5/2005 | Zhu et al. |
| 6,993,723 B1 | 1/2006 | Danielsen et al. |
| 7,127,704 B2 | 10/2006 | Van De Vanter et al. |
| 7,159,207 B2 | 1/2007 | Tang et al. |
| 2001/0052190 A1 | 12/2001 | Duncan |
| 2001/0052910 A1 | 12/2001 | Parekh et al. |
| 2002/0100016 A1 | 7/2002 | Van De Vanter et al. |
| 2002/0106991 A1* | 8/2002 | Foore et al. ................... 455/70 |
| 2002/0107866 A1 | 8/2002 | Cousins et al. |
| 2003/0061046 A1 | 3/2003 | Zhao et al. |
| 2003/0066058 A1 | 4/2003 | Van De Vanter et al. |
| 2003/0208427 A1 | 11/2003 | Peters et al. |
| 2003/0229648 A1 | 12/2003 | Tang et al. |
| 2004/0003373 A1 | 1/2004 | Van De Vanter et al. |
| 2004/0003374 A1 | 1/2004 | Van De Vanter et al. |
| 2004/0006763 A1 | 1/2004 | Van De Vanter et al. |
| 2004/0030741 A1 | 2/2004 | Wolton et al. |
| 2004/0054644 A1* | 3/2004 | Ganesh et al. ................... 707/1 |
| 2004/0225997 A1 | 11/2004 | Van Der Vanter et al. |
| 2004/0225998 A1 | 11/2004 | Van Der Vanter et al. |

2005/0022132 A1  1/2005  Herzberg et al.

OTHER PUBLICATIONS

Martin Sevior, "Re: UCS-2 vs. UCS-4", Jun. 23, 2001, abiword-dev mailing list archive, accessed on Sep. 23, 2005 at <http://www.abisource.com/mailinglists/abiword-dev/01/June/0610.html>.*
Conner and Coskun, "Undo Model", Nov. 1993, IBM Technical Disclosure Bulletin, vol. 36, No. 11, pp. 85-87.*
Carrano et al., "Data Abstraction and Problem Solving with C++", Aug. 1998, Addison-Wesley, Chapter 4.*
Brun et al., "The Token-Oriented Approach to Program Editing", Feb. 1985, SIGPLAN Notices, vol. 20, No. 2, pp. 17-20.*
Gutknecht, "Concepts of the Text Editor Lara", Sep. 1985, Communications of the ACM, vol. 28, No. 9, pp. 942-960.*
Balance, Robert A. et al, "*The Pan Language-Based Editing System*," ACM Transactions on Software Engineering and Methodology, vol. 1, Issue 1, Jan. 1992, pp. 95-127.
Finseth, Craig A, "*The Craft of Text Editing*," Springer-Verlag, New York, 1991.
Teitelbaum, Tim et al., "*The Cornell Program Synthesizer: A Syntax-Directed Programming Environment,*" Communications of the ACM, vol. 24, Issue 9, Sep. 1981, pp. 563-573.
Bahlke, Rolf, et al., "the PSG System: From Formal Langauge Definitions to Interactive Programming Environments," *ACM Transactions on Programming Languages and Systems*, vol. 8, No. 4 (Oct. 1986), pp. 547-576.
Borras, P., et al., "Centaur: the system," Proceedings ACM SIGSOFT '88: Third Symposium on Software Development Environment (Nov. 1988), pp. 14-24.
Donzeau-Gouge, V. et al., "Programming Environments Based on Structured Editors: the Mentor Experience," *Interactive Programming Enviroments*, David R. Barstow et al., editors, McGraw-Hill, New York, NY (1984), pp. 128-140.
Franke, Charles H., III et al., "Authoring a Hypertext UNIX Help Manual," *ACM*, 1995, pp. 238-245.
Friendly, Lisa, "The Design of Distributed Hyperlinked Programming Documentation," Sun Microsystems, 1995, 25 pages.
Jordan, Mick, et al., "Modular System Building with JavaTM Packages," 8th Conference on Software Engineering Environment, Apr. 1997.
Jordan, Mick, et al., "Software Configuration Management in an Object Oriented Database," USENIX Conference on Object-Oriented Technologies (COOTS), Jun. 1995.
Lang, Bernard, "On the Usefulness of Syntax Directed Editors," *Advanced Programming Environments, Lecture Notes in Computer Science*, vol. 244, Reldar Conradi et al, editors, Springer Verlag, Berlin (1986), pp. 47-51.
Letovsky, S., et al., "Delocalized Plans and Program Comprehension," *IEEE Software EE* (May 1986), pp. 41-49.
McFedries, Paul, *Visual Basic for Applications Unleashed*, Sams MacMillian Computer Publishing, ISBN 0672310465, Published Mar. 21, 1997 (excerpts).
Meyrowitz, et al., "Interactive Editing Systems: Part I," 1982, *ACM*, vol. 14, No. 3, pp. 321-352.
Meyrowitz, et al., "Interactive Editing Systems: Part II," 1982, *ACM*, vol. 14, No. 3, pp. 353-415.
Murer, Tobias, et al., "Replacing Copies With Connections: Managing Software across the Virtual Organization," IEEE 8th International Workshop on Enabling Technologies: Infrastructure for Collaborative Enterprises, Stanford University, California, USA, Jun. 16-18, 1999.
Neal, Lisa Rubin, "Cognition-Sensitive Design and User Modeling for Syntax-Directed Editors," *Proceedings SIG-CHI Conference on Human Factors in Computing Systems*, Toronto, Canada (Apr. 1987), pp. 99-102.
Notkin, David, "The GANDALF Project," *Journal of Systems and Software*, vol. 5, No. 2 (May 1985), pp. 91-105.
Reps, T., "Maximal-Munch' Tokenization in Linear Time," 1998, *ACM*, vol. 20, No. 2, pp. 259-273.
Reps, T., et al., *The Synthesizer Generator Reference Manual*, Texts and Monographs in Computer Science, 3rd Ed., Springer-Verlag, NY, 1989, 180 pages.

Simonis, Volker, *ProgDOC—A Program Documentation System*, Wilhelm-Schickard-Institut Fur Informatik, 2003, 27 pages.
Soloway, E., et al., "Empirical Studies of Programming Knowledge," *IEEE Transactions on Software Engineering*, vol. SE-10, No. 5 (Sep. 1984), pp. 595-609.
Stallman, Richard M., "EMACS: The Extensible, Customizable, Self-Documenting Display Editor," Proceedings of the ACM-SIGPLAN SIGOA Symposium on Text Manipulation, *SIGPLAN Notices*, vol. 16, No. 6 (Jun. 8-10, 1981), pp. 147-156.
Van De Vanter, M. et al., "Coherent User Interfaces for Language-Based Editing Systems," *International Journal of Man-Machine Studies*, vol. 37, No. 4 (1992), pp. 431-466 (reprinted in *Structure-Based Editors and Environments*, Gerd Szwillus and Lisa Neal Eds., Academic Press, 1996).
Van De Vanter, Michael L., "Biblio Text Version 5.0: A Hypertext Browser for Bibliographic Data and Notes," UC Berkeley Technical Report No. UCB/CSD 90/603, 47 pp., Nov. 1990.
Van De Vanter, Michael L., "Coordinated Editing of Versioned Packages in the JP Programming Environment," 8th International Symposium on System Configuration Management, Jul. 1998.
Van De Vanter, Michael L., "Practical Language-Based Editing for Software Engineers," Software Engineering and Human-Computer Interaction: ICSE '94 Workshop on SE-HCI: Joint Research Issues, Sorrento, Italy, May 1994 Proceedings, *Lecture Notes in Computer Science*, vol. 896, Richard N. Taylor and Joelle Coutaz, editors, Springer Verlag, Berlin (1995), pp. 251-267.
Van De Vanter, Michael L., "The Documentary Structure of Source Code," Information & Software Technology, vol. 44, iss. 13, pp. 767-782, Oct. 1, 2002.
Van De Vanter, Michael L., "User Interaction in Language-Based Editing Systems," Ph.D. Dissertation, UC Berkeley, Dec. 1992.
Van De Vanter, Michael L., et al., "Displaying and Editing Source Code on Software Engineering Environments," Second International Symposium on Constructing Software Engineering Tools (CoSET'2000), Limerick, Ireland, Jun. 5, 2000.
Van De Vanter, Michael L., et al., "Global Names: Support for Managing Software in a World of Virtual Organizations," Ninth International Symposium on System Configuration Management (SCM-9) , Toulouse, France, Sep. 5-7, 1999.
Crowley, Charles, "Data Structures for Text Sequences", 1998, CiteSeer, accessed on Sep. 22, 2005 at <http://citeseer.ist.psu.edu/crowley98data.html>.
Sevoir, Martin, "Re: UCS-2 vs. UCS-4", Jun. 23, 2001, abiword-dev mailing list archive, accessed on Sep. 23, 2005 at <http://www.abisource.com/mailinglists/abiword-dev/01/June/0610.html>.
Conner, M.H., et al., "Undo Model", Nov. 1993, IBM Technical Disclosure Bulletin, vol. 36, No. 11, pp. 85-87.
Carrano, Frank, et al., "Data Abstraction and Problem Solving with C++", Aug. 1998, Addison-Wesley, Chapter 4., pp. 147-214.
Arefi, F. et al., "Automatically Generating Visual Syntax-Directed Editors," Communications ACM, vol. 33, No. 3, Mar. 1990, pp. 349-360.
Ford, Bryan, "Packrat, parsing, simple, powerful, lazy, linear time," ACM ICFP, pp. 36-47, 2002.
Ramsey, Norman, "Literate Programming Simplified," IEEE Software, vol. 11, Issue 5 (Sep. 1994), pp. 97-105.
Baecker, R.M., et al., "Human Factors and Typography for More Readable Programs", ACM Press, 1990, p. 334-337.
Baker, N. et al., "An Object Model for Product and Workflow Data Management," Database and Expert Systems Applications, 1998, 4 pgs.
Proceedings: Ninth International Workshop on Database and Expert Systems Applications, Aug. 26-28, 1998, pp. 731-738.
Grundy, John C. et al., "Support for Collaborative, Integrated Software Development," IEEE 1995, pp. 84-94.
Lee, Byong G. et al., "An Integrated Approach to Version Control Management in Computer Supported Collaborative Writing," ACM 1998, pp. 34-43.
Prakash, Atul et al., "DistView: Support for Building Efficient Collaborative Applications using Replicated Objects," ACM 1994, pp. 153-164.

Kitchovitch, Milosh M., "Parsing Method Supporting the Process of Program Editing with Online Syntax Checking," Jan. 1993, Problems of Engineering Cybernetics and Robotics, vol. 40, pp. 49-59.

Shilling, John J., "Incremental LL(1) parsing in Language-Based Editors," Sep. 1992, IEEE Transactions on Software Engineering, vol. 19, No. 9, pp. 935-940.

Lunney, T.F. et al., "Syntax-Directed Editing," Mar. 1988, Software Engineering Journal, vol. 3, No. 2, pp. 37-46.

Madhavji, Nazim H. et al., "Semi-Structured Cursor Movements in MUPE-2," Nov. 1989, Software Engineering Journal, vol. 4, No. 6, pp. 309-317.

Zelkowitz, Marvin V. et al., "Experiences Buiding a Syntax-Directed Editor," Nov. 1989, Software Engineering Journal, vol. 4, No. 6, pp. 294-300.

Video DVD: Siggraph Video Review: Magpie—Tektronix. (Item #9), Issue 9, CHI'95, Jun. 1985.

Oman, Paul W. et al., "Typographic Style Is More Than Cosmetic," Communications of the ACM, May 1990, vol. 33, No. 5, pp. 506-520.

Reps, Thomas et al., "The Synthesizer Generator Reference Manual," Dept. of Computer Science, Jul. 1987, Section 3, pp. 79-106.

Ballance, Robert A. et al., "Grammatical Abstraction and Incremental Syntax Analysis in a Language-Based Editor," Jun. 1988, pp. 185-198.

Calliss, Frank W., "Problems with Automatic Restructurers," Nov. 1987, University of Durham, Durham, England, pp. 13-21.

Schwartz, Mayer D. et al., "Incremental Compilation in Magpie," Jun. 1984, vol. 19, No. 6, pp. 122-131.

Levin, Roy et al., "The Vesta Approach to Precise Confuguration of Large Software Systems," Jun. 14, 1993, Digital Systems Research Center, pp. 1-38.

Ballance, Robert A. et al., "The Pan Language-Based Editing System," Sep. 1991, ACM Transactions on Software Engineering & Methodology, vol. 1, pp. 95-127.

Gray, Robert W: "$\lambda$-GLA: A Generator for Lexical Analyzers That Programmers Can Use," Jun. 1988, Proceedings of the Summer 1988 Usenix Conference, San Franciso, CA, USA, pp. 147-160.

Reiss, Steven P: "Automatic Compiler Production: The Front End," IEEE Transactions on Sofware Engineering, Jun. 1987, vol. SE-13, No. 6, , pp. 609-627.

Levine, John R. et al., Doug Brown Lex & Yacc O'Reilly & Associates Inc, Subostopal, CA 1992, I pg.

Thiemann, Peter, "Grammar-Based Analysis of String Expressions," ACM 2005, pp. 59-70.

Ford, Bryan "Parsing Expression Grammars: A Recognition Based Syntactic Foundation," ACM 2004, pp. 111-122.

"Re: Piece Tables," Apr. 4, 2000, http://www.abisource.com/mailinglists/abiword-dev/00/April/0055.html, 4 pages.

Timoshkina, Uljana et al., "Structured Documents Processing using Lex and Yacc," 2001, http://citeseer.ist.psu.edu/475903.html, 1 pg.

* cited by examiner

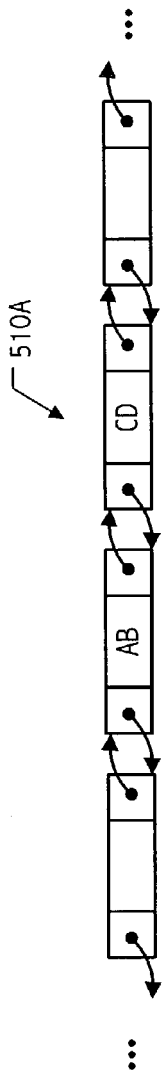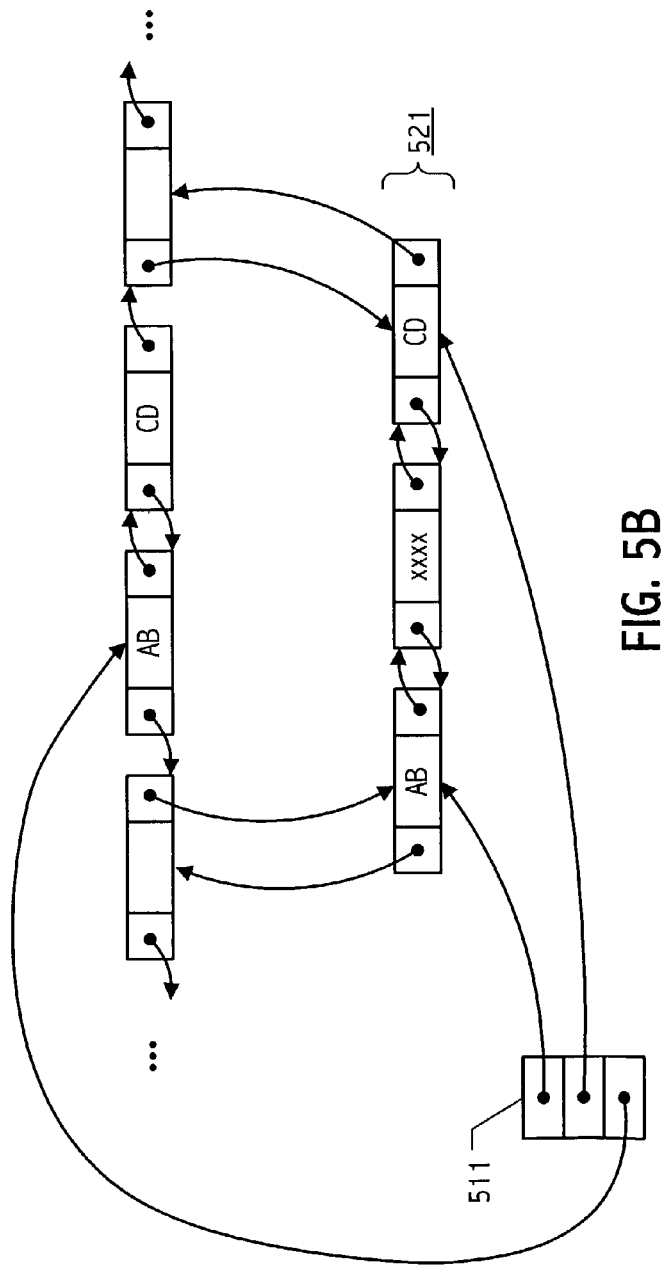

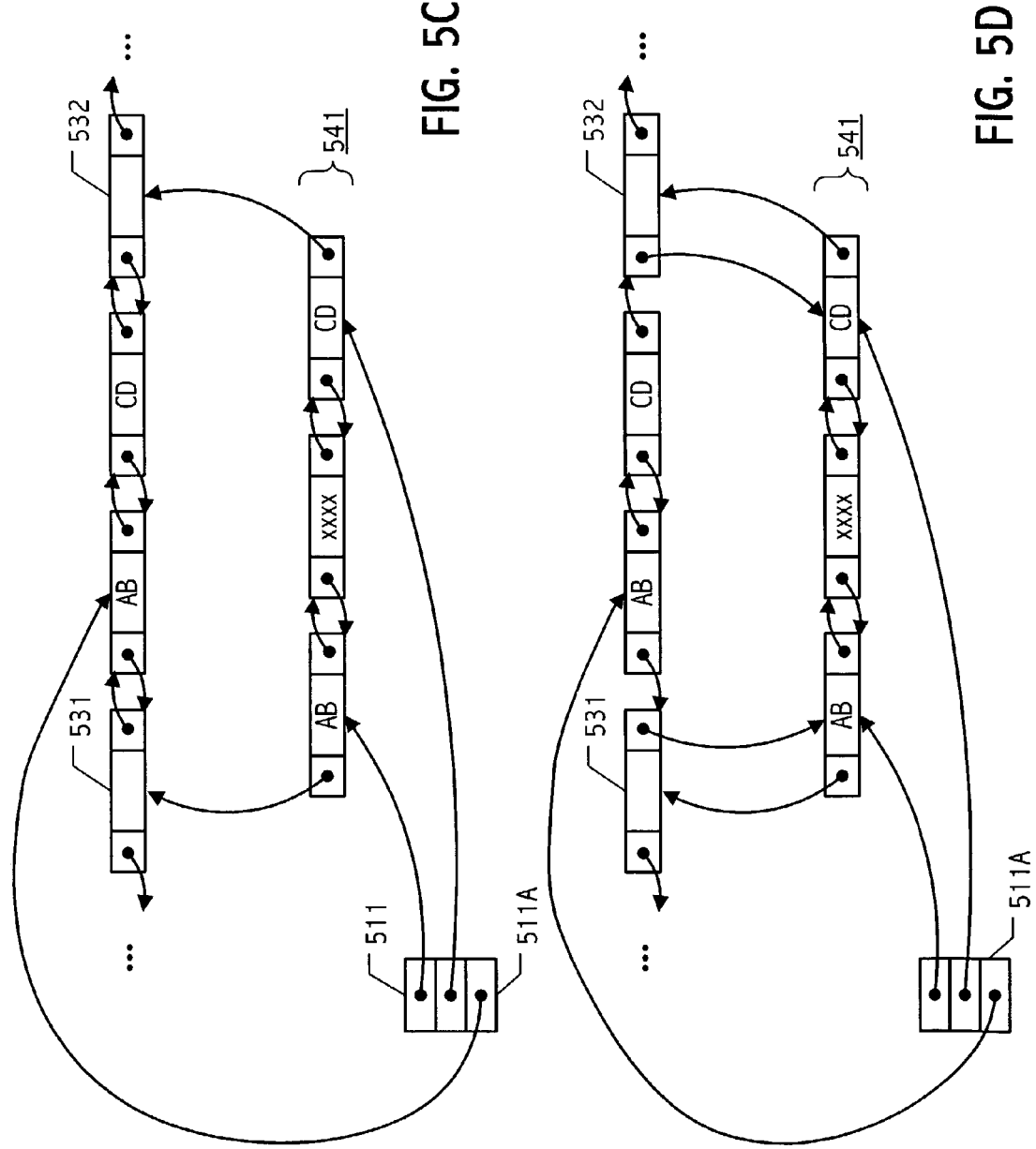

UNDO/REDO TECHNIQUE FOR TOKEN-ORIENTED REPRESENTATION OF PROGRAM CODE

CROSS-REFERENCE TO RELATED APPLICATION(S)

This application is related to commonly owned U.S. patent application Ser. No. 10/185,752, entitled "TOKEN-ORIENTED REPRESENTATION OF PROGRAM CODE WITH SUPPORT FOR TEXTUAL EDITING THEREOF," naming Van De Vanter and Urquhart as inventors and filed on even date herewith, Ser. No. 10/185,753, entitled "EFFICIENT COMPUTATION OF CHARACTER OFFSETS FOR TOKEN-ORIENTED REPRESENTATION OF PROGRAM CODE," naming Van De Vanter and Urquhart as inventors and filed on even date herewith and Ser. No. 10/185,754, entitled "UNDO/REDO TECHNIQUE WITH INSERTION POINT STATE HANDLING FOR TOKEN-ORIENTED REPRESENTATION OF PROGRAM CODE," naming Van De Vanter and Urquhart as inventors and filed on even date herewith.

BACKGROUND

1. Field of the Invention

The present invention relates generally to interactive software engineering tools including editors for source code such as a programming or mark-up language, and more particularly to facilities for supporting undo and/or redo operations on a token-oriented representation.

2. Description of the Related Art

In an editor for computer programs, it may be desirable to represent program code using a token-oriented representation, rather than as simply a linear sequence of characters. In such a representation, the linear sequence of characters that corresponds to program code may be divided into substrings corresponding to the lexical tokens of the particular language. In some implementations, this representation of a stream of tokens can updated incrementally after each user action (for example, after each keystroke) using techniques such as those described in U.S. Pat. No. 5,737,608 to Van De Vanter, entitled "PER KEYSTROKE INCREMENTAL LEXING USING A CONVENTIONAL BATCH LEXER." In general, such updates may require the insertion and/or deletion of tokens in or from the token stream.

A commonly supported and highly desirable function of conventional text editors is "Undo-Redo." This function permits a user to reverse the effects of the most recently performed editing operation (i.e., to Undo it), and then optionally to reverse the undo in order to get back to the original state (i.e., Redo the Undo). It is generally desirable for such Undo-Redo functionality to permit a compound or multi-step Undo operation, thereby permitting the user to unwind as many of the most recently performed editing operations as desired. A compound Redo correspondingly reverses a sequence of Undo operations.

SUMMARY

While undo-redo facilities are common in conventional text editors that employ a conventional text buffer, provision of an undo-redo facility in a software engineering tool environment that employs a token-oriented representation of program code presents unique design challenges. In general, it would desirable if undo-redo operation support could be provided for an underlying token-oriented representation in a way that ensures that such operations take no more time than other basic editing operations. In particular, it is desirable for computational requirements associated with undo-redo operations to scale such that an operation takes no more than O(N) time, where N corresponds to the size of the operation (i.e., content inserted or deleted) and where the computational requirements are generally insensitive to the size of the program being edited.

Accordingly, it has been discovered that an editor or software engineering tool may be configured to represent program code as a doubly-linked list of lexical tokens and to maintain, coincident with an operation that modifies contents of the list, an undo object that identifies opposing end nodes of a sublist of one or more lexical tokens corresponding to a substring that is either inserted into or removed from the list by the operation. In this way, lexical tokens corresponding to an inserted substring can be readily and efficiently excised to restore a pre-insertion tokenized list state. Similarly, lexical tokens corresponding to a removed substring can be readily and efficiently reinstated to restore a pre-deletion tokenized list state. Advantageously, undo support once employed to restore a prior tokenized list state is symmetrically available to support redo operations. In some embodiments in accordance with the present invention, undo-redo entries are maintained in an operation ordered set that is traversed to support one or more operations in either the undo or redo directions. In some realizations, such an ordered set of undo-redo entries is maintained by, or in conjunction with, an undo-redo manager.

By identifying at least opposing end nodes of respective sublists of one or more lexical tokens that correspond to substrings inserted into and removed from the tokenized program representation, even lengthy, complex undo (or redo) sequences can be supported with a computational overhead that scales with the number of undone (or redone) operations rather than buffer size or even size of the edits performed. As a result, a software engineering tool that employs techniques in accordance with the present invention provides extremely efficient undo-redo support even in software engineering environments that handle large bodies of program code or that provide language-oriented features such as advanced program typography or editor behavior specialized based on lexical context.

BRIEF DESCRIPTION OF THE DRAWINGS

The present invention may be better understood, and its numerous objects, features, and advantages made apparent to those skilled in the art by referencing the accompanying drawings.

FIGS. 2A and 2B illustrate states before and after an edit operation that inserts tokens into the representation. FIGS. 2C and 2D illustrate states after respective undo and redo operations.

FIGS. 3A and 3B illustrate states before and after an edit operation that removes tokens from the representation. FIGS. 3C and 3D illustrate states after respective undo and redo operations.

FIGS. 5A, 5B, 5C and 5D illustrate, in accordance with some embodiments of the present invention, states of a tokenized program representation and of related undo-redo representations in relation to operations that replace a first set of one or more tokens of the program representation with a second set, typically in response to user edits. In particular, FIGS. 5A and 5B illustrate states before and after an edit operation that replaces tokens in the representation. FIGS. 5C and 5D illustrate states after respective undo and redo operations.

The use of the same reference symbols in different drawings indicates similar or identical items.

DESCRIPTION OF THE PREFERRED EMBODIMENT(S)

Exploitations of the techniques of the present invention are many. In particular, a variety of software engineering tools are envisioned, which employ aspects of the present invention to facilitate undo-redo in a token-oriented representation of program code. One exemplary software engineering tool is a source code editor that provides specialized behavior or typography based on lexical context using a tokenized program representation. Such a source code editor provides a useful descriptive context in which to present various aspects of the present invention. Nonetheless, the invention is not limited thereto. Indeed, applications to editors, analyzers, builders, compilers, debuggers and other such software engineering tools are envisioned. In this regard, some exploitations of the present invention may provide language-oriented behaviors within suites of tools or within tools that provide functions in addition to manipulation of program code.

In addition, while traditional procedural or object-oriented programming languages provide a useful descriptive context, exploitations of the present invention are not limited thereto. Indeed, other software engineering tool environments such as those adapted for editing, analysis, manipulation, transformation, compilation, debugging or other operations on functionally descriptive information or code, such as other forms of source code, machine code, bytecode sequences, scripts, macro language directives or information encoded using markup languages such as HTML or XML, may also employ structures, methods and techniques in accordance with the present invention. Furthermore, the structures, methods and techniques of the present invention may be exploited in the manipulation or editing of other information, such as software documentation or even prose. Based on the description herein, persons of ordinary skill in the art will appreciate applications to a wide variety of tools and language contexts.

Accordingly, in view of the above and without limitation, an exemplary exploitation of the present invention is now described.

Tokenized Program Representation with Undo-Redo Support

Figure 1:
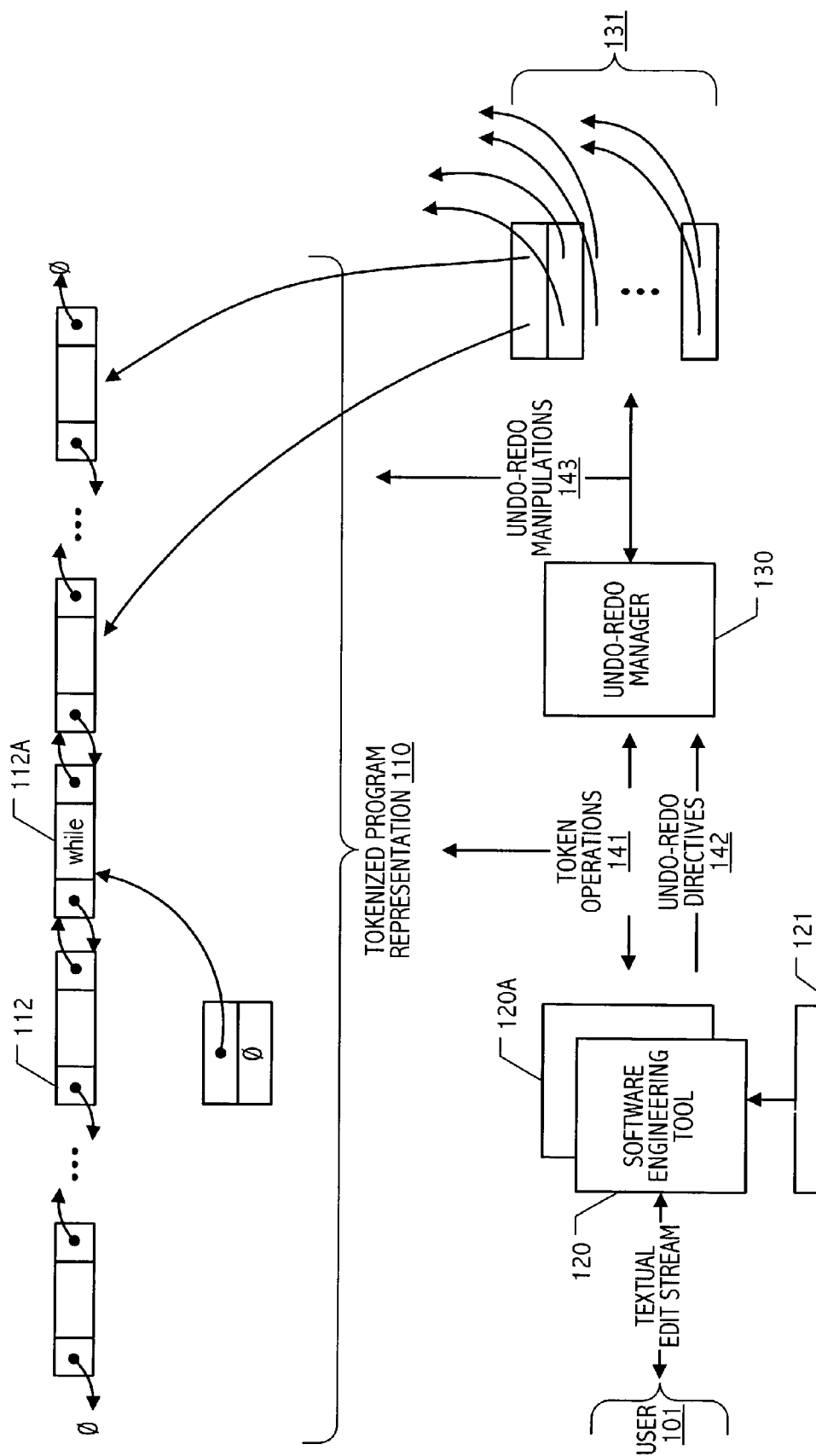
FIG. 1 depicts operation of one or more software engineering tools that operate on and/or maintain a tokenized program representation including undo/redo facilities in accordance with some embodiments of the present invention.

FIG. 1 depicts operation of one or more software engineering tools (e.g., software engineering tools 120 and 120A) that operate on, maintain and/or traverse a tokenized representation of information, such as tokenized program representation 110. In FIG. 1, a doubly-linked list representation of tokenized program code is illustrated. Of course, any of a variety of variable-size structures that support efficient insertion and removal may be employed. For example, although the illustration of FIG. 1 suggests plural nodes configured in a doubly-linked list arrangement with textual information associated with each such node, other information and coding arrangements are possible. In some realizations, node-associated information may be encoded by reference, i.e., by a pointer identifying the associated information, or using a token code or label. In some variations, identical textual or other information content associated with different nodes may be encoded as multiple pointers to a same representation of such information. In some realizations, information may even be encoded in the body of a node's structure itself. Whatever the particular design choice, the illustrated doubly-linked list encoding provides a flexible way of representing the tokenized program content and provides a useful illustrative context.

In the illustration of FIG. 1, an insertion point representation (e.g., insertion point 111) is used to identify a particular point in the tokenized list structure at which edit operations operate. The insertion point may be manipulated by navigation operations, as a result of at least some edit operations, or (in some configurations) based on operations of a programming tool such as a source level debugger. A variety of insertion point representations are suitable, including insertion point representations that encode text offsets. See e.g., co-pending U.S. patent application Ser. No. 10/185,752, entitled "TOKEN-ORIENTED REPRESENTATION OF PROGRAM CODE WITH SUPPORT FOR TEXTUAL EDITING THEREOF," naming Van De Vanter and Urquhart as inventors and filed on even date herewith and Ser. No. 10/185,753, entitled "EFFICIENT COMPUTATION OF CHARACTER OFFSETS FOR TOKEN-ORIENTED REPRESENTATION OF PROGRAM CODE," naming Van De Vanter and Urquhart as inventors and filed on even date herewith, each of which is incorporated in its entirety herein by reference. In such variations, additional data may be encoded in association with an insertion point representation to improve the efficiency of manipulations of the tokenized program representation. For purposes of this description, any of a variety of insertion point representations may be employed.

As illustrated in FIG. 1, one or more software engineering tools may operate on the contents of tokenized program representation 110 using token operations 141. Illustrative token operations include insertion, removal, and/or replacement of tokens in or from tokenized program representation 110. Lexical rules 121 facilitate decomposition, analysis and/or parsing of a textual edit stream, e.g., that supplied through interactions with user 101, to transform textual operations into token oriented operations. In general, any of a variety of lexical analysis techniques may be employed. However, in some implementations, tokens are updated incrementally after each user action (for example, after each keystroke) using incremental techniques such as those described in U.S. Pat. No., 5,737,608 to Van de Vanter, entitled "PER KEYSTROKE INCREMENTAL LEXING USING A CONVENTIONAL BATCH LEXER," the entirety of which in incorporated herein by reference. Other lexical analysis techniques may be employed in a given implementation. Whatever the techniques employed, a textual edit stream will, in general, result in updates to tokenized program representation 110 that can be defined in terms of insertions, deletion and/or replacements of one or more tokens thereof. The description that follows describes insertion, deletion and replacement operations and associated representations that facilitate efficient undo-redo handling.

An undo-redo manager 130 maintains an ordered set 131 of undo-redo objects or structures that facilitate manipulations of tokenized program representation 110 to achieve the semantics of undo and redo operations. In general, undo-redo manager 130 is responsive to undo-redo directives 142 supplied by software engineering tool 120. Typically, undo-redo directives are themselves responsive to user manipulations, although other sources (such as from automated tools) are also possible. In the illustration of FIG. 1, individual undo-redo structures identify respective nodes of the tokenized program representation to facilitate undo and redo operations as now described with reference to FIGS. 2A through 5D. Undo-redo manager implementations for editors that represent content in a text buffer are well known in the art, see e.g., Finseth, *The Craft of Text Editing,* Springer-Verlag (1991). Indeed, one suitable undo-redo manager framework that may be extended with objects and methods described herein is the Swing graphical user interface (GUI) component toolkit, part of the Java Foundation Classes (JFC) integrated into Java 2 platform, Standard Edition (J2SE), available from Sun Microsystems, Inc. In particular, the subclass javax.swing.undo.UndoManager (available at java.sun.com) and its related classes, objects and methods provide one exemplary implementation of a suitable undo-redo manager implementation framework.

FIGS. 2A, 2B, 2C and 2D illustrate various successive states of a tokenized program representation that is manipulated in response to an insert operation (i.e., an operation that inserts one or more tokens) and successive undo and redo operations. Beginning with FIG. 2A, we illustrate a partial state 210A of the tokenized program representation in which program code has been tokenized in accordance with lexical rules appropriate for a programming language, such as the C programming language. For simplicity of illustration, only a partial state corresponding to a fragment, . . . while (!done) . . . , of the total program code is illustrated and the illustrated insertion adds a token chain corresponding to an additional predicate.

Figure 2A:
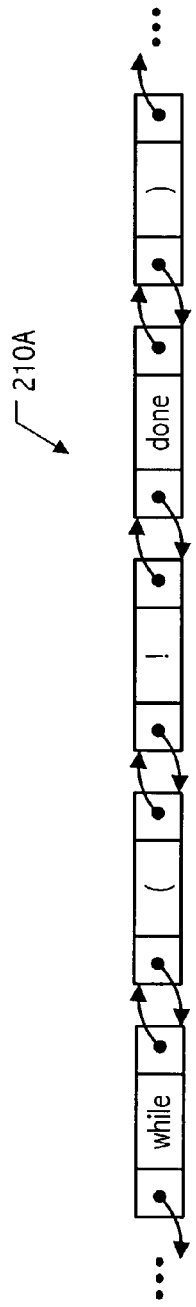
FIGS. 2A, 2B, 2C and 2D illustrate, in accordance with some embodiments of the present invention, states of a tokenized program representation and of related undo-redo representations in relation to operations that insert tokens into the program representation, typically in response to user edits. In particular.
Figure 2B:
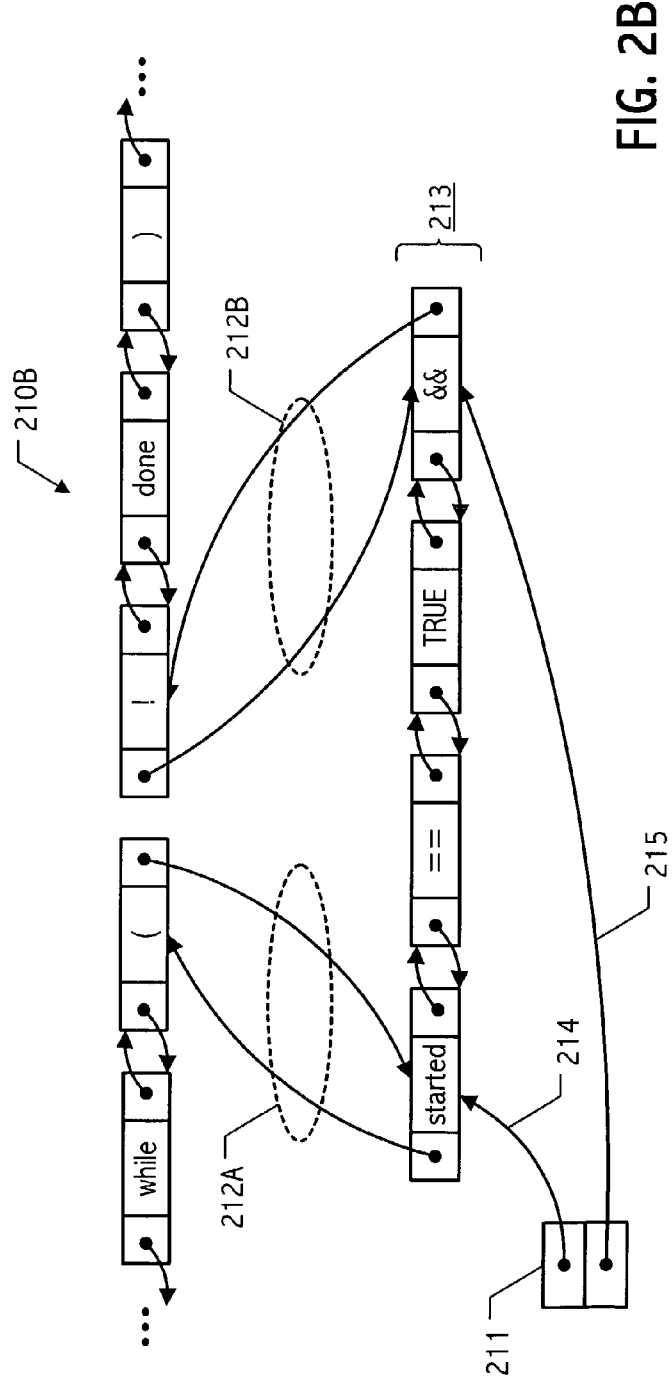

Moving on to FIG. 2B, we illustrate the result of an insertion into the tokenized program representation (pre-insertion state 210A) of four additional tokens (fragment 213) corresponding to user edits of the program code. In the illustration of FIG. 2B, updates to bi-directional pointers 212A and 212B effectuate the token insertion into the tokenized program representation resulting in post-insertion state 210B. Of note, an undo-redo structure 211 is illustrated, which directly identifies (through respective pointers 214 and 215) opposing ends of the inserted fragment 213. For simplicity of illustration, only the undo-redo structure associated with the illustrated insertion is shown in FIG. 2B. However, based on the description herein, persons of ordinary skill in the art will appreciate that a total representation of program code and undo-redo state may (and typically does) include additional undo-redo structures.

Figure 2C:
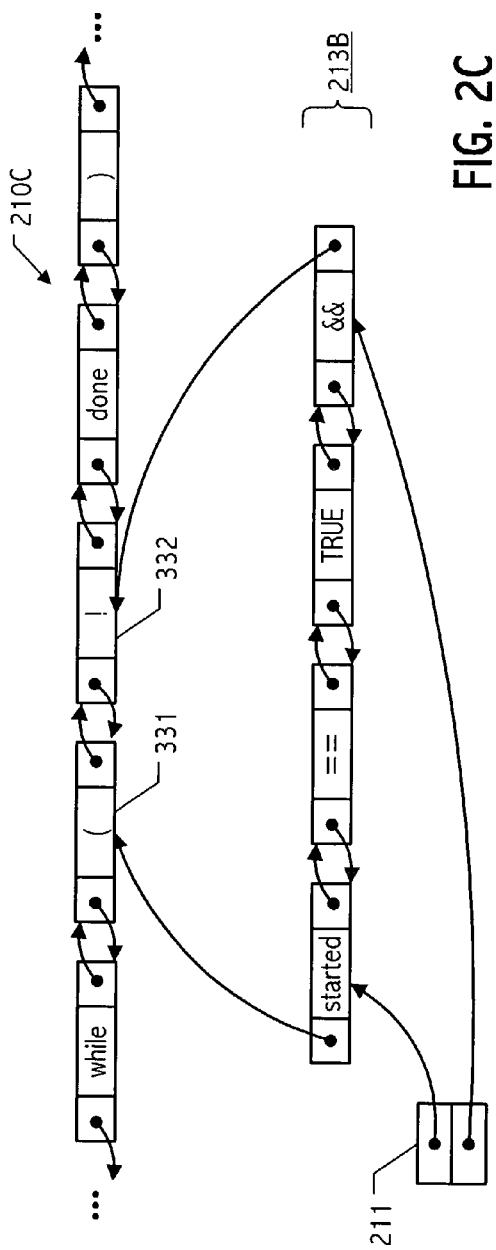

Turning to FIG. 2C, we illustrate results of an undo operation that reverses the effect on the tokenized program representation of the previously executed insertion operation. Note that, while the doubly-linked list state is restored, the previously inserted fragment 213B of tokens continues to be represented and identified by a corresponding undo-redo structure, namely undo-redo structure 211. Furthermore, the previously inserted program fragment (now excised from the tokenized program representation, state 210C) maintains its identification of splice point nodes in the tokenized program representation, namely splice point nodes 331 and 332. In this way, the states of the tokenized program representation and of the previously inserted, but undone, fragment 213B identified by undo-redo structure 211 are well situated to support redo of the previously undone insertion.

Figure 2D:
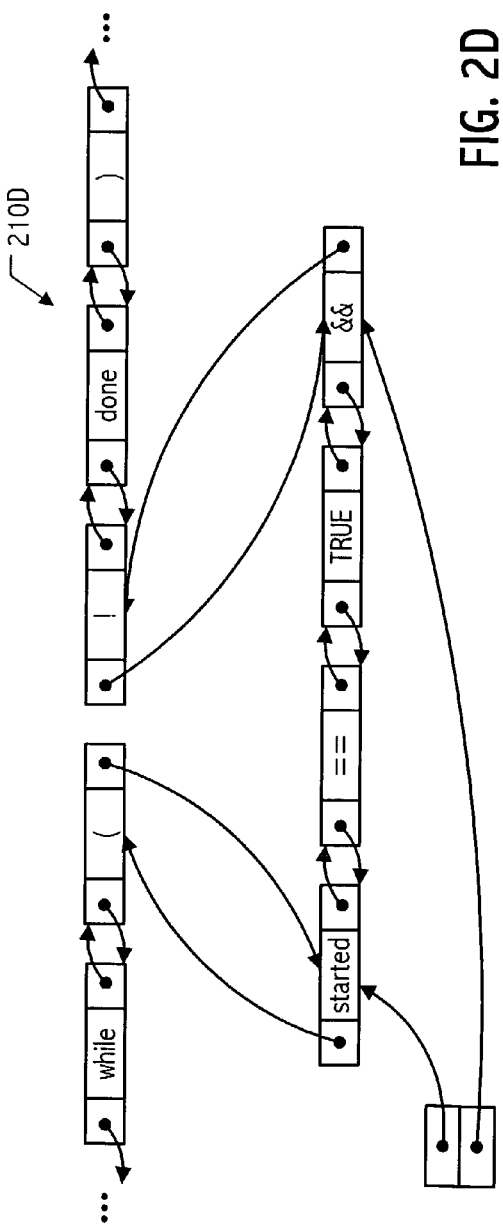

Results of a redo are illustrated in FIG. 2D. Reinstatement of the token insertion into the tokenized program representation is effectuated by re-establishing the bi-directional pointer chain through previously inserted (and previously-undone) fragment 213B, resulting in post-redo state 210D. Of note, undo-redo structure 211 state (see FIG. 2C) provides the reference chains that allow update of respective pointers of splice point nodes 331 and 332 to efficiently redo the previously undone insertion of fragment 213. After completion of the redo operation, undo-redo structure 211 continues to identify (through respective pointers 214 and 215) opposing ends of the inserted fragment 213. In this way, a subsequent undo may be efficiently supported.

Based on the description above, persons of ordinary skill in the art will appreciate a variety suitable functional implementations to support the above-described token insertion, undo of token insertion, and redo of token insertion. The exemplary code that follows illustrates one such suitable functional implementation.

```
// Represents a token in a doubly linked list. There are sentinel
// tokens at each end of the list, so that no pointers in tokens
// which are proper members of the list are null.
class Token {
    public Token next;
    public Token previous;
}
// Method for inserting tokens into a doubly linked list
// Precondition:
// - <point> refers to a token in a doubly linked list of Tokens with
//     sentinels, or possibly to the ending sentinel
// - <first> refers to the first of a doubly linked list of at least
//     one Token, which are not in the list referred to by <point>;
//     <last> refers to the last of these tokens
// Postcondition: the tokens beginning with <first> and ending with
// <last> are in the token list, which is otherwise unchanged,
// immediately prior to the token pointed to by <point>
InsertionUndoRedo Insert (Token point, Token first, Token last) {
    Token lastBefore = point.previous;
    Token firstAfter = point;
    lastBefore.next = first;
    first.previous = lastBefore;
    last.next = firstAfter;
    firstAfter.previous = last;
    return new InsertionUndoRedo (first,last);
}
// Represents the ability to undo/redo the insertion of a range
// of tokens from a doubly linked token list with sentinels.
class InsertionUndoRedo {
    private Token first;
    private Token last;
    public InsertionUndoRedo (Token first, Token last) {
```

```
        this.first = first;
        this.last = last;
    }
    // Precondition: state of the token list is just as it was when
    // the tokens were originally inserted and this object created.
    // Postcondition: state of token list is just as it was before
    // the tokens were originally inserted; the inserted tokens are
    // not in the list.
    Undo ( ) {
        Token lastBefore = first.previous;
        Token firstAfter = last.next;
        lastBefore.next = firstAfter;
        firstAfter.previous = lastBefore;
    }
    // Precondition: state of the token list is just as before the
    // tokens were originally inserted and this object created;
    // the tokens beginning with <first> and ending with <last> are
    // not in the token list.
    // Postcondition: state of the token list is just as it was
    // when the tokens were originally inserted and this object
    // created; the inserted tokens are back in the list in their
    // inserted location.
    Redo ( ) {
        Token lastBefore = first.previous;
        Token firstAfter = last.next;
        lastBefore.next = first;
        firstAfter.previous = last;
    }
}
```

The preceding code is object-oriented and is generally suitable for use in an implementation framework such as that presented by the previously described Swing graphical user interface (GUI) component toolkit, part of the Java Foundation Classes (JFC) integrated into Java 2 platform, Standard Edition (J2SE). However, other implementations, including procedural implementation and implementations adapted to design constraints of other environments, are also suitable.

Figure 3A:
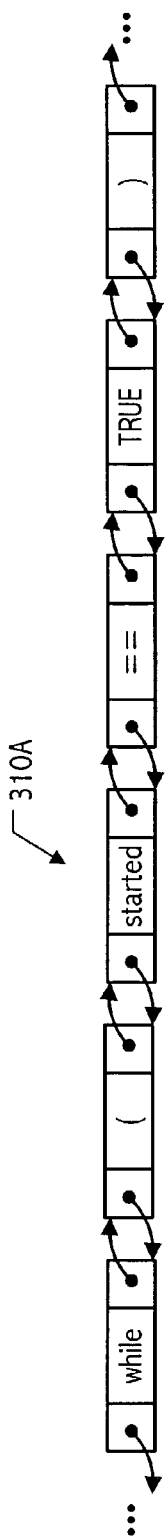
FIGS. 3A, 3B, 3C and 3D illustrate, in accordance with some embodiments of the present invention, states of a tokenized program representation and of related undo-redo representations in relation to operations that remove tokens from the program representation, typically in response to user edits. In particular.

FIGS. 3A, 3B, 3C and 3D illustrate various successive states of a tokenized program representation that is manipulated in response to a remove operation (i.e., an operation that removes one or more tokens) and successive undo and redo operations. As before, FIG. 3A illustrates an initial partial state 310A of a tokenized program representation. For simplicity, only a partial state corresponding to a fragment, . . . while (started==TRUE) . . . , of the total program code is illustrated and the illustrated deletion removes tokens corresponding to potentially superfluous code.

Figure 3B:
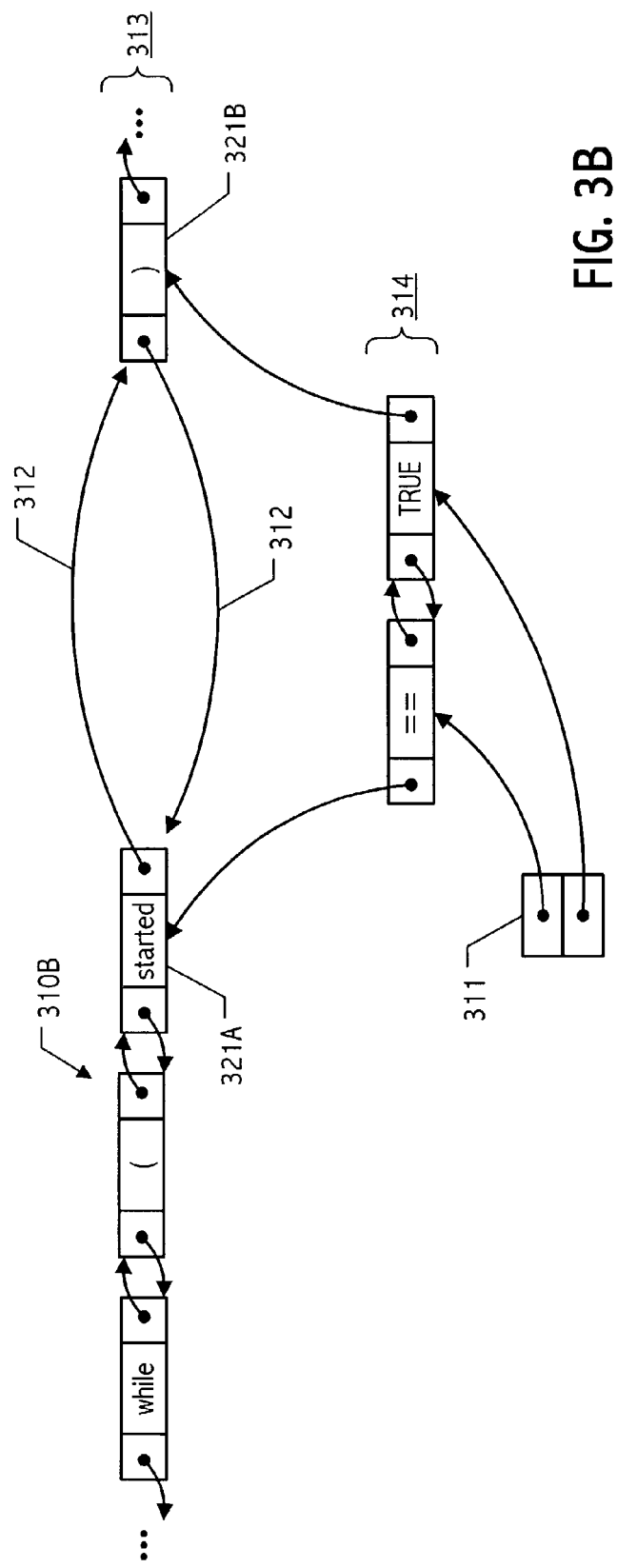

FIG. 3B then illustrates the result of a removal from the tokenized program representation (i.e., from pre-removal state 310A) of two tokens (fragment 314) corresponding to user edits of the program code. In the illustration of FIG. 3B, bi-directional pointers 312 are updated to bridge the excised fragment 314. An undo-redo structure 311 identifies (through respective pointers) opposing end nodes of the excised fragment 314. Note that excised fragment 314 maintains its single direction pointers into respective excision point nodes 321A and 321B to facilitate efficient undo. As before, only the undo-redo structure associated with the illustrated removal is shown in FIG. 3B, although a total representation of program code and undo-redo state may (and typically does) include additional undo-redo objects.

Figure 3C:
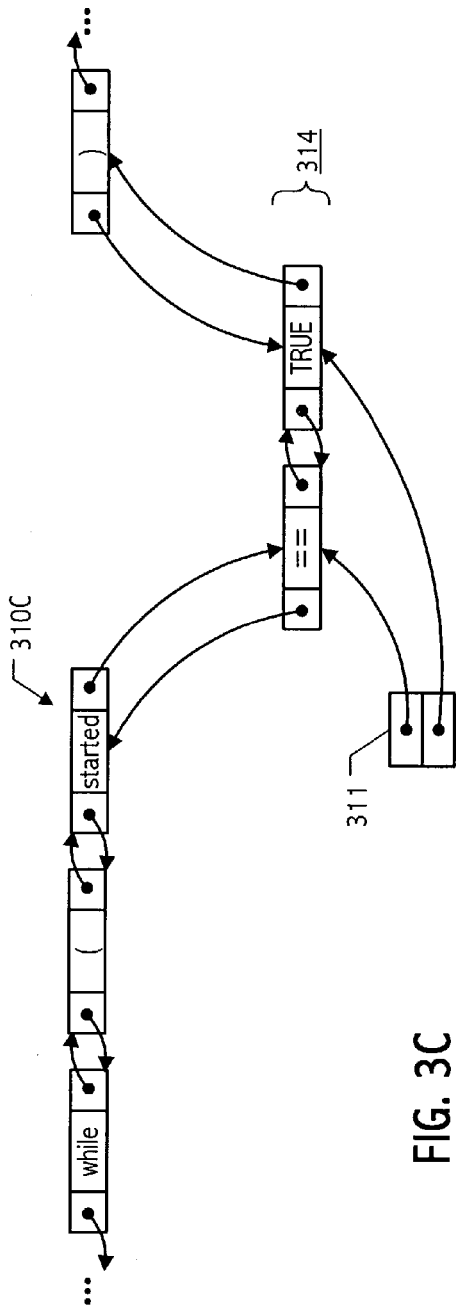
Figure 3D:
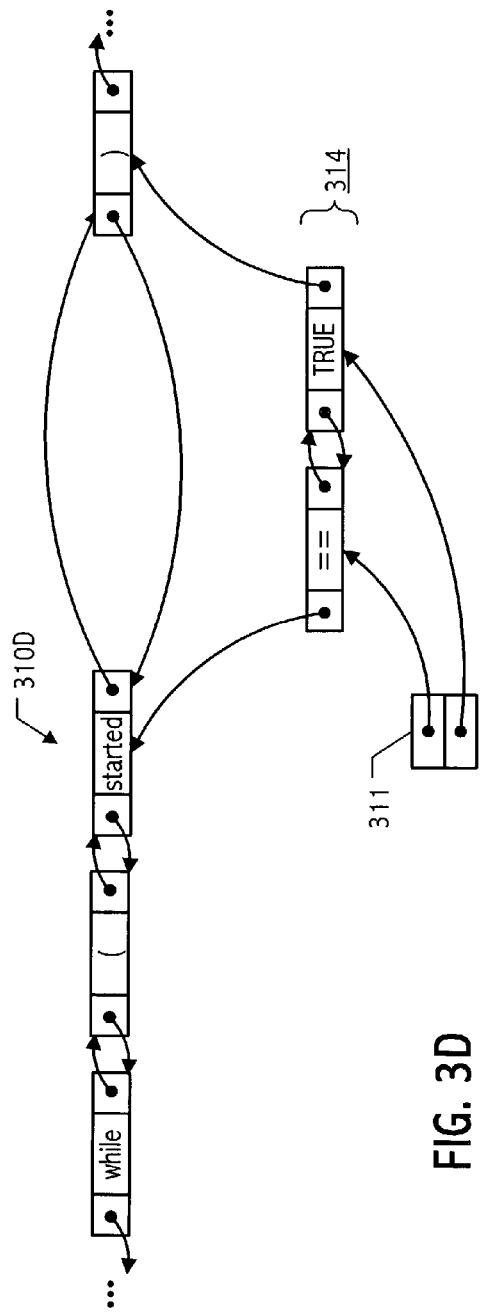

Turning to FIG. 3C, we illustrate results of an undo operation that reverses the effect on the tokenized program representation of the previously executed removal operation. In particular, the previously excised token fragment 314 is reintroduced into the doubly-linked list. Note that the state of undo-redo object 311 maintains its identification of leading and trailing nodes of the previously excised, now reinstated, fragment 314. In this way, redo of the previously undone removal of token fragment 314 can be efficiently performed as illustrated by the results of FIG. 3D.

As before, undo-redo object 311 maintains its identification of leading and trailing nodes of tokenized program fragment 314 to support an efficient redo. Reinstatement of the removal is effectuated by updating bi-directional pointers of the tokenized program representation (see state 310D) to bridge the excised fragment 314. As before, undo-redo structure 311 identifies (through respective pointers) opposing end nodes of the excised fragment 314 and excised fragment 314 maintains its single direction pointers into respective excision point nodes to facilitate efficient undo.

The exemplary code that follows illustrates one suitable functional implementation of the above-described token removal, undo of token removal, and redo of token removal.

```
// Represents a token in a doubly linked list.
// There are sentinel tokens at each end of the list, so that no
// pointers in tokens which are proper members of the list are null.
class Token {
    public Token next;
    public Token previous;
}
// Method for deleting tokens from a doubly linked list
// Precondition:
// - <first> and <last> point to tokens in a doubly linked list of
//     Tokens with sentinels
// - the token <first> is either the same as, or prior to the token
//     <last> in the list
// Postcondition: the tokens beginning with <first> and ending with
// <last> are no longer in the token list, which is otherwise
// unchanged.
DeletionUndoRedo Delete (Token first, Token last) {
    Token lastBefore = first.previous;
    Token firstAfter = last.next;
    lastBefore.next = firstAfter;
    firstAfter.previous = lastBefore;
    return new DeletionundoRedo (first,last);
}
// Represents the ability to undo/redo the deletion of a range
// of tokens from a doubly linked token list with sentinels.
class DeletionUndoRedo {
    private Token first;
    private Token last;
    public DeletionUndoRedo (Token first, Token last) {
        this.first = first;
        this.last = last;
    }
    // Precondition: state of the token list is just as it was when
    // the tokens were originally deleted and this object created.
    // Postcondition: state of token list is just as it was before
    // the tokens were originally deleted; the deleted tokens are
    // back in the list in their original location.
    Undo ( ) {
        Token lastBefore = first.previous;
        Token firstAfter = last.next;
        lastBefore.next = first;
        firstAfter.previous = last;
    }
    // Precondition: state of the token list is just as it was
    // after Undo was invoked: the deleted tokens are back in the
    // list in their original location.
    // Postcondition: state of the token list is just as it was
    // when the tokens were originally deleted and this object
    // created; the tokens beginning with <first> and ending with
    // <last> are no longer in the token list, which is otherwise
    // unchanged.
    Redo ( ) {
        Token lastBefore = first.previous;
        Token firstAfter = last.next;
        lastBefore.next = firstAfter;
```

```
            firstAfter.previous = lastBefore;
        }
}
```

While the previously described insertion and removal operations have been illustrated primarily in the context of a single operation and its associated undo and redo methods, based on the description herein, persons of ordinary skill in the art will recognize that in a typical editing session, or for that matter, in the course of operation another programming tool, multiple insertions and removals of program fragments will occur. Indeed, large number of such insertions and removals will occur and, in general, can be represented as an ordered set of such operations. In some cases, one operation (e.g., a removal) will operate on results of the previous operation (e.g., an insertion). Accordingly, in the general case, it is desirable to represent an ordered set 410 of undo-redo objects (e.g., objects 411A, 411B, etc.) to facilitate the undoing and/or redoing of arbitrary sequences of operations.

Figure 4:
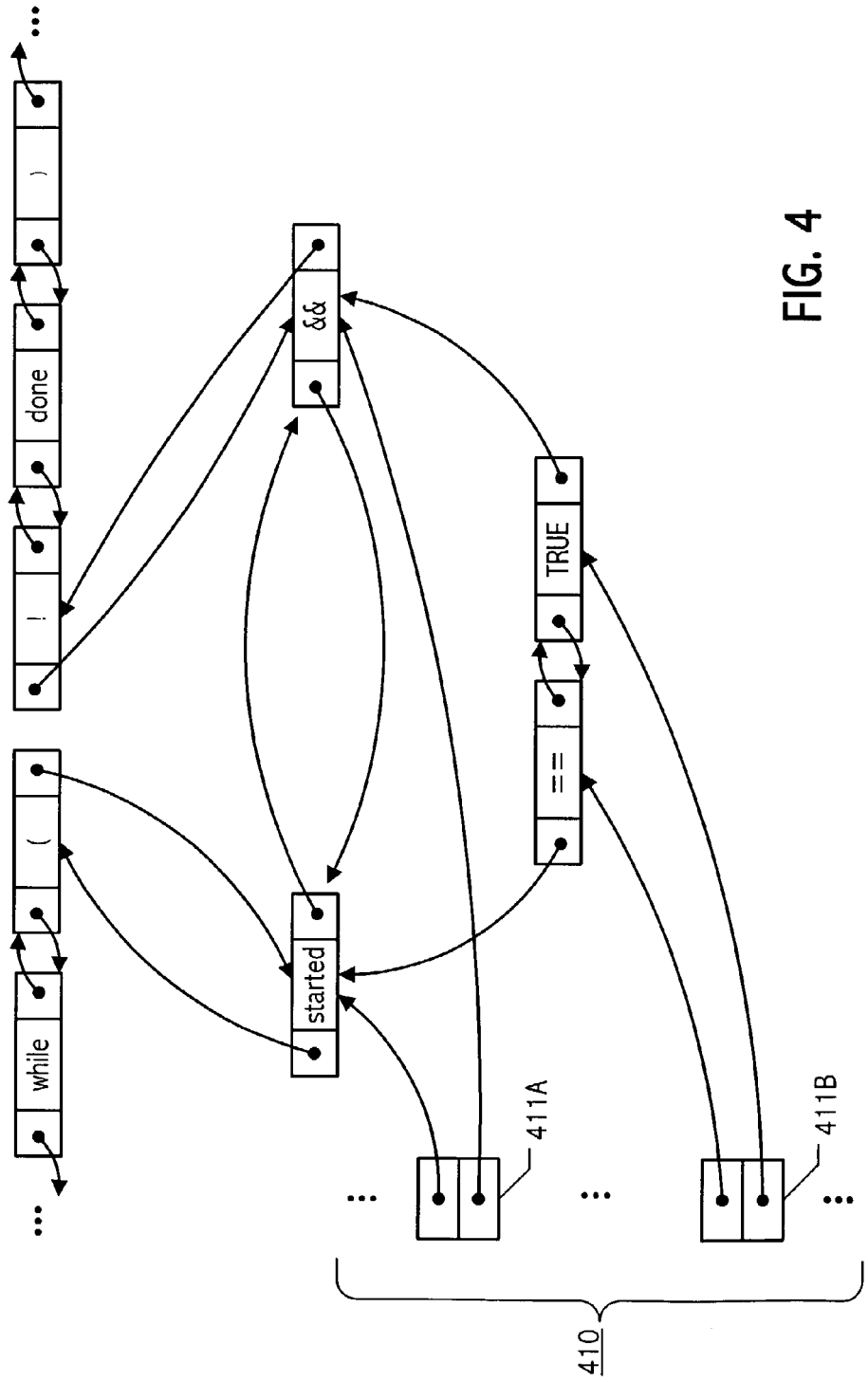
FIG. 4 illustrates, in accordance with some embodiments of the present invention, an ordered set of undo-redo records together with a portion of a tokenized program representation after both an insertion of tokens into the representation and partial deletion of thereof.

FIG. 4 represents a tokenized program representation that illustrates results of an insertion operation that is followed by a removal operation that targets a portion of the previously inserted code. A partial state 410 of the tokenized program representation and an illustrative state of undo-redo objects are depicted. In particular, ordered set 410 of undo-redo objects includes an undo-redo object 411A that identifies opposing ends of the inserted four node fragment, while undo-redo object 411B identifies an interior portion thereof that has been removed from the state 410 of the tokenized program representation by a subsequent removal operation. Of course, any of a variety of additional edit operations, including intervening edit operations, may correspond to other undo-redo objects (now shown) of the ordered set. In general, the ordered set can be represented in any of a variety of ways. One such representation is as a linked list of such undo-redo objects (links not shown) wherein a current point in the ordered set is maintained and execution of undo operations moves the current point back in the ordered set, while execution of redo operations move the current point forward in the ordered set.

In general, semantics of undo and redo operations are well understood in the art. Of course, a given implementation may seek to limit the amount of storage allocated to undo and redo support and, accordingly, may restrict the growth of the ordered set to a predetermined size. Nonetheless, the techniques described herein may be employed more generally in an unbounded ordered set of undo-redo objects and any particular limitation on sizing of such a structure may be selected based on constraints of a particular implementation or design.

FIGS. 5A, 5B, 5C and 5D illustrate various successive states of a tokenized program representation that is manipulated in response to a replace operation (i.e., an operation that replaces, in the tokenized representation, a first set of one or more tokens with a second set) and successive undo and redo operations. As before, FIG. 5A illustrates an initial partial state 510A of a tokenized program representation.

Turning to FIG. 5B, we illustrate replacement of a two token fragment <AB> <CD> with a three token fragment <AB> <xxx> <CD>, illustrated as fragment 521. Operation of such a replace operation is similar to that previously illustrated with respect to an insertion operation except that, rather than operating at a particular insertion point, the splicing in of tokenized program code fragment 521 displaces a fragment of the previous program representation state. To facilitate reinstatement of the displaced fragment, an addition has been made to undo-redo structure 511. In particular, an additional field has been added to identify the displaced fragment. In illustration of FIG. 5B, identification is achieved by identifying a lead node of the displaced fragment. More generally, any node of the displaced fragment may suffice, though for simplicity of implementations that choose either the leading or trailing node of the displaced fragment are generally preferable. For increased efficiency, undo-redo structure 511 can be modified to include a second field (not specifically shown) identifying the displaced fragment. In this way, both leading and trailing nodes may be identified, obviating traversal to identify an opposing end. As a result, replacement may be performed at fixed, O(1), overhead rather than with O(N) scaling based on the size of the displaced fragment.

Referring now to FIG. 5C, results of an undo operation are illustrated. In particular, using the contents of additional field 511A of undo-redo object 511, an undo operation identifies the previously-displaced fragment and updates the forward pointer of node 531 to partially reinstate the previously displaced fragment. Similarly, execution of the undo operation serves to update the rearward point of node 532 to complete the reinstatement. Note that previously described fields of the undo-redo object provide referencing chains to identify nodes 531 and 532. As before, the previously inserted, but now undone, tokenized program fragment, i.e., fragment 541, remains identified by pointers represented in undo-redo structure 511. In this way, efficient redo of the now undone replace operation can be supported.

FIG. 5D illustrates results of a redo operation. Since leading and trailing nodes of tokenized program fragment 541 maintain their identification of splice points, namely nodes 531 and 532, redo of the replace operation is straightforward. Identification of the again displaced two node fragment is maintained using contents of undo-redo structure field 511A. Although the preceding example has illustrated operation of a replacement operation and corresponding undo and redo operations in the context of a three node for two node replacement, persons of ordinary skill in the art will recognize that the illustrated techniques are more generally applicable to displaced and replacement fragments of any size. Similarly, persons of ordinary skill in the art will recognize that semantics of an insert operation that splits a pre-existing token may be efficiently implemented as a replace operation. Functional code to implement such a replace operation follows:

```
// Represents a token in a doubly linked list.
// There are sentinel tokens at each end of the list, so that no
// pointers in tokens which are proper members of the list are null.
class Token {
        public Token next;
        public Token previous;
}
// Method for replacing tokens in a doubly linked list
// Precondition:
// - <oldFirst> and <oldLast> point to tokens in a doubly linked list
//     of Tokens with sentinels
// - the token <oldFirst> is either the same as, or prior to the
//     token <oldLast> in the list
// - <newFirst> refers to the first of a doubly linked list of at
//     least one Token, which are not in the list referred to by
//     <oldFirst> and <oldLast>; <newLast> refers to the last of these
//     tokens
```

-continued

```
// Postcondition: the tokens beginning with <newFirst> and ending
// with <newLast> are in the token list in place of the tokens
// beginning with <oldFirst> and ending with <oldLast>.
// - the token list is otherwise unchanged
ReplacementUndoRedo Replace (Token oldFirst, Token oldLast,
                            Token newFirst, Token newLast) {
    Token lastBefore = oldFirst.previous;
    Token firstAfter = oldLast.next;
    lastBefore.next = newFirst;
    newFirst.previous = lastBefore;
    newLast.next = firstAfter;
    firstAfter.previous = newLast;
    return new ReplacementUndoRedo (oldFirst, newFirst,
        newLast);
}
// Represents the ability to undo/redo the replacement of a range
// of tokens from a doubly linked token list with sentinels.
class ReplacementUndoRedo {
    private Token oldFirst;
    private Token newFirst;
    private Token newLast;
    public ReplacementUndoRedo (Token oldFirst, Token newFirst,
                                Token newtast) {
        this.oldFirst = oldFirst;
        this.newFirst = newFirst;
        this.newLast = newLast;
    }
    // Precondition: state of the token list is just as it was when
    // the tokens were originally replaced and this object created.
    // Postcondition: state of token list is just as it was before
    // the tokens were originally replaced; the replaced tokens are
    // in the list in their original location, and the new tokens
    // are not in the list.
    Undo ( ) {
        Token lastBefore = newFirst.previous;
        Token firstAfter = newLast.next;
        Token oldLast = oldFirst;
        while (oldLast.next != firstAfter)
            oldLast = oldLast.next;
            lastBefore.next = oldFirst;
            firstAfter.previous = oldLast;
    }
    // Precondition: state of the token list is just as before the
    // tokens were originally replaced and this object created;
    // the tokens beginning with <newFirst> and ending with
    // <newLast> are not in the token list.
    // Postcondition: state of the token list is just as it was
    // when the tokens were originally replaced and this object
    // created.
    Redo ( ) {
        Token lastBefore = newFirst.previous;
        Token firstAfter = newLast.next;
        lastBefore.next = newFirst;
        firstAfter.previous = newLast;
    }
}
```

In the preceding exemplary code, the oldFirst field or attribute corresponds to additional field 511A.

Exemplary Editor Implementation

In general, techniques of the present invention may be implemented using a variety of editor implementations. Nonetheless, for purposes of illustration, the description of exemplary editor implementations in U.S. Pat. No. 5,737,608, entitled "PER-KEYSTROKE INCREMENTAL LEXING USING A CONVENTIONAL BATCH LEXER" is incorporated herein by reference. In particular, while the preceding code implements token operations, persons of ordinary skill in the art will recognize that editor and/or programming tools implementations may often include operations that operate at a level of abstraction that corresponds to character manipulations. Such character-oriented manipulations typically affect the state of an underlying token-oriented representation and such state changes can be effectuated using token operations such as the insertion, removal and replacement operations described herein. To generate sequences of token-oriented operations that correspond to character manipulations, incremental lexing techniques described in the '608 patent may be employed in some realizations.

Figure 6:
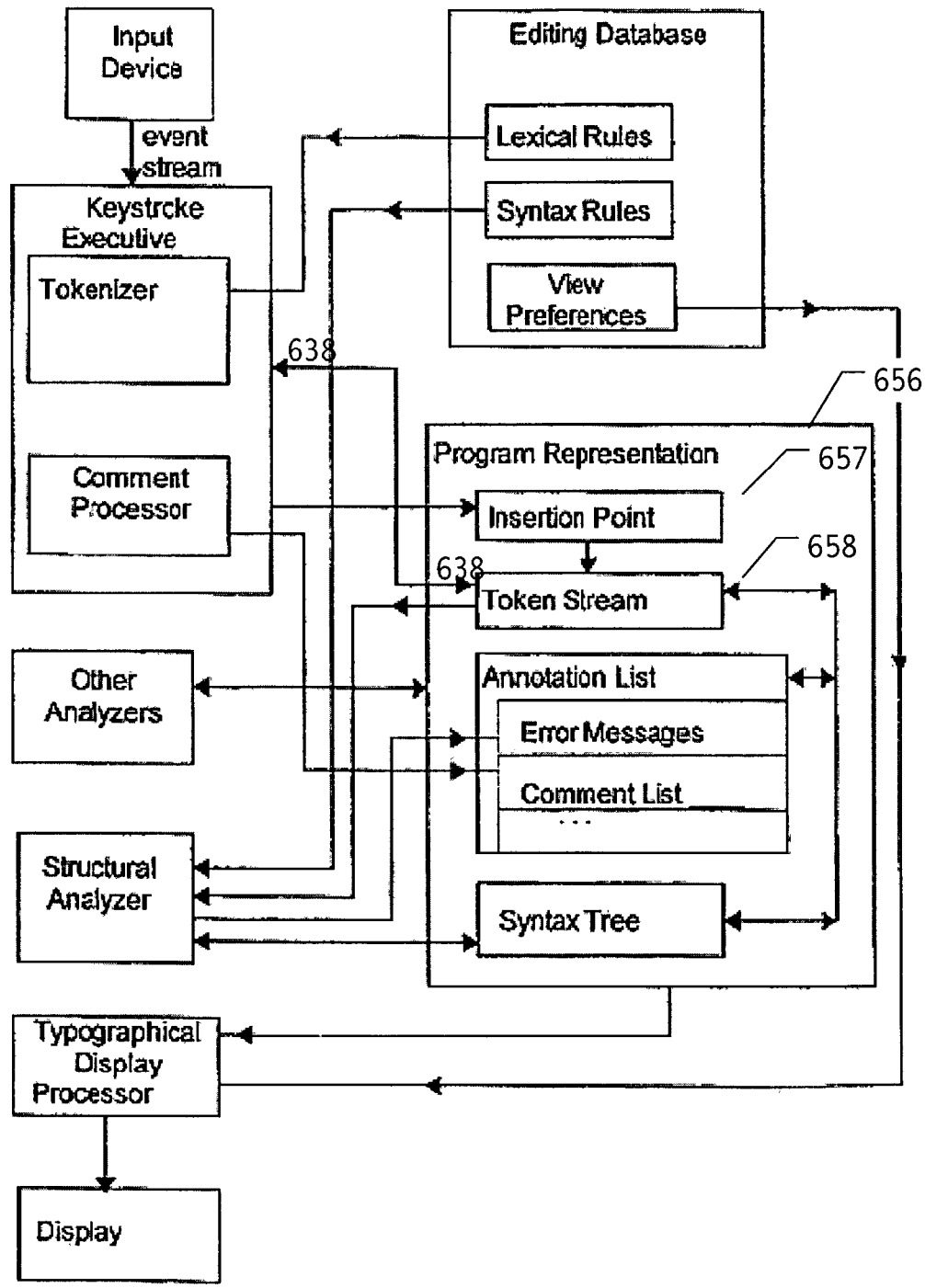
FIG. 6 depicts interactions between various functional components of an exemplary editor implementation that employs a token-oriented representation and for which undo-redo support may be provided in accordance with techniques of the present invention.

FIG. 6 depicts interactions between various functional components of an exemplary editor implementation patterned on that described in greater detail in the '608 patent. In particular, techniques of the present invention are employed to implement program representation 656, and particularly token stream representation 658 and insertion point representation 657, to support efficient undo and redo operations. By implementing operations 638, including insert, remove and/or replace operations, on token stream representation 658 as described above, undo-redo objects are maintained in correspondence with edit operations efficient undo-redo operations are supported. Based on the description herein, including the above-incorporated description, persons of ordinary skill in the art will appreciate a variety of editor implementations that may benefit from features and techniques of the present invention.

While the invention has been described with reference to various embodiments, it will be understood that these embodiments are illustrative and that the scope of the invention is not limited to them. Many variations, modifications, additions, and improvements are possible. In particular, a wide variety of lexical contexts may be supported. For example, while a lexical context typical of program code has been illustrated, other lexical contexts such as those appropriate to markup languages, comments, even multimedia content may be supported. Similarly, although much of the description has focused on functionality of an editor, the techniques described herein may apply equally to other interactive or even batch oriented tools. While lexical analysis of textual content has been presumed in many illustrations, persons of ordinary skill in the art will recognize that the techniques described herein also apply to structure-oriented editors and to implementations that provide syntactic, as well as lexical, analysis of content.

More generally, plural instances may be provided for components described herein as a single instance. Boundaries between various components, operations and data stores are somewhat arbitrary, and particular operations are illustrated in the context of specific illustrative configurations. Other allocations of functionality are envisioned. Structures and functionality presented as discrete in the exemplary configurations may be implemented as a combined structure or component. These and other variations, modifications, additions, and improvements may fall within the scope of the invention as defined in the claims that follow.

What is claimed is:

1. A method of providing undo operation support in an edit buffer, the method comprising:

representing the edit buffer as a doubly-linked list of nodes for a tokenized program representation, each node corresponding to a respective lexical token in the tokenized program representation; and maintaining, as a side-effect of operations that modify contents of the list, an ordered set of undo objects that identify at least respective opposing-end nodes of respective sublists of one or more lexical tokens in the tokenized program representation corresponding to respective substrings inserted into the list by respective insert-type operations, wherein at least one of the sublists comprises different opposing end nodes stored non-contiguously and each of the sublists is a doubly linked list.

2. The method of claim 1, further comprising:
maintaining the ordered set of undo objects to further identify at least respective opposing-end nodes of respective doubly-linked sublists of one or more lexical tokens corresponding to respective substrings removed from the list by respective remove-type operations.

3. The method of claim 2,
wherein the opposing-end nodes of a particular sublist removed from the list by execution of a particular one of the remove-type operations maintain an identification of respective predecessor and successor nodes of the list prior to the execution of the particular remove-type operation.

4. The method of claim 2, further comprising:
restoring, coincident with an undo directive, the doubly-linked list of lexical tokens to a state that existed prior to execution of a particular remove-type operation at least in part by reintroducing thereinto the sublist identified by a corresponding one of the undo objects; and
maintaining as a redo object, identification of at least the opposing end nodes of the reintroduced sublist.

5. The method of claim 1,
wherein, for a particular lexical token of the list replaced by a replace-type operation, the maintaining includes encoding in a corresponding one of the undo objects an identification of the replaced token.

6. The method of claim 1,
wherein, for a particular lexical token of the list split by an insert-type operation, the maintaining includes replicating in a sublist inserted into the list, substrings corresponding to the split token; and
wherein the corresponding one of the undo objects further identifies a particular node corresponding to the split token.

7. The method of claim 1, further comprising:
restoring, coincident with an undo directive, the doubly-linked list of lexical tokens to a state that existed prior to execution of a particular insert-type operation at least in part by removing therefrom the sublist identified by a corresponding one of the undo objects; and
maintaining as a redo object, identification of at least the opposing end nodes of the removed sublist.

8. The method of claim 7,
wherein the corresponding one of the undo objects and the redo object are encoded as a same object.

9. The method of claim 1,
wherein at least one of the undo objects identifies a sublist that includes a single lexical token, and wherein opposing-end nodes of the sublist are a same node.

10. A software engineering tool encoded in one or more computer readable media, the software engineering tool comprising:
a representation of program code encoded in a computer readable medium as a doubly-linked list of nodes for a tokenized program representation, each node corresponding to a respective token in the tokenized program representation recognized in accordance with an operative set of lexical rules;
functional encodings of edit methods, including at least insert-type and remove-type methods, the edit methods executable to operate on the list of nodes; and
an undo-redo manager that maintains an ordered set of undo-redo objects in correspondence with operation of the edit methods, the undo-redo objects identifying opposing-end nodes of sublists of tokens inserted into the list and removed therefrom by operation of the insert-type and remove-type methods, respectively, wherein at least one of the sublists comprises different opposing end nodes stored non-contiguously and each of the sublists is a doubly-linked list.

11. The software engineering tool of claim 10, further comprising:
a functional encoding of an undo directive that reverses effects of a previously executed edit method on state of the list, while maintaining the identification of opposing-end nodes of a corresponding doubly-linked sublist of tokens for use in a subsequent redo directive.

12. The software engineering tool of claim 10,
a functional encoding of a redo directive that reinstates effects of a previously executed edit method on state of the list, while maintaining the identification of opposing-end nodes of a corresponding sublist of tokens for use in a subsequent undo directive.

13. A software engineering tool encoded in one or more tangible computer readable media as instructions executable to represent program code as a doubly-linked list of lexical tokens for a tokenized program representation and to maintain, coincident with an operation that modifies contents of the list, a first undo object that identifies at least opposing end nodes of a sublist of one or more lexical tokens in the tokenized program representation corresponding to a substring that is either introduced into or removed from the list by the operation, wherein the sublist comprises different opposing end nodes stored non-contiguously and is a doubly-linked list.

14. The software engineering tool of claim 13,
wherein the operation is an insert-type operation and the sublist of lexical tokens corresponds to a substring introduced by the insert-type operation.

15. The software engineering tool of claim 13,
wherein the operation is an remove-type operation and the sublist of lexical tokens corresponds to a substring removed by the remove-type operation.

16. The software engineering tool of claim 13,
wherein the instructions are further executable, coincident with an undo directive, to restore the doubly-linked list of lexical tokens to a prior state using the sublist identified by the first undo object, and to maintain as a redo object identification of at least the opposing end nodes of the sublist.

17. The software engineering tool of claim 16,
wherein the first undo object and the redo object are encoded as a same object.

18. The software engineering tool of claim 13,
wherein an operation-ordered store of undo objects, including the first undo object, is maintained for use by the software engineering tool.

19. The software engineering tool of claim 13, further comprising:
an operation-ordered store of undo-redo objects, including the first undo object.

20. The software engineering tool of claim 13,
wherein the one or more tangible computer readable media are selected from the set of a disk, tape or other magnetic, optical, or electronic storage medium.

21. One or more tangible computer readable media encoding a data structure that represents contents of an edit buffer as a sequence of lexical tokens, the encoded data structure comprising:

a doubly linked list of nodes for a tokenized program representation;

token representations, each corresponding to at least one respective node of the list, wherein at least some of the token representations have associated substring encodings; and an edit-operation-ordered representation of undo objects that each identify at least opposing end nodes of respective sublists of one or more lexical tokens in the tokenized program representation that correspond to substrings that are either introduced into or removed from the list by edit operations, wherein at least one of the sublists comprises different opposing end nodes stored non-contiguously and each of the sublists is a doubly-linked list.

22. The encoded data structure of claim 21, wherein the identification of opposing end nodes allows reversal of substring introductions and removals in response to respective undo directives with a computational burden that is independent of size of the edit buffer and independent of size of the substrings introduced and removed.

23. The encoded data structure of claim 21, embodied as a software object that defines at least one of the edit operations.

24. The encoded data structure of claim 21, wherein the one or more tangible computer readable media are selected from the set of a disk, tape or other magnetic, optical, or electronic storage medium.

25. An apparatus comprising:

storage for a computer readable encoding of an edit buffer represented as a sequence of lexical tokens for a tokenized program representation; and means for maintaining an edit-operation-ordered representation of undo objects that each identify at least opposing end nodes of respective sublists of one or more lexical tokens in the tokenized program representation that correspond to substrings that are either introduced into or removed from the list by edit operations, wherein at least one of the sublists comprises different opposing end nodes stored non-contiguously and each of the sublists is a doubly-linked list.

26. The apparatus of claim 25, further comprising:

means for reversing a particular execution of one of the edit operations using the opposing-end nodes identification of a corresponding one of the undo objects.

27. The apparatus of claim 26, further comprising:

means for maintaining the opposing-end nodes identification corresponding to the reversed edit operation for use in reinstatement of the reversed edit operation.

* * * * *